United States Patent [19]
Krapcho et al.

[11] 3,929,783
[45] Dec. 30, 1975

[54] 1-SUBSTITUTED-4-PHENYL-4H-[1,2,4]TRIAZOLO[3,4-C][1,4]BENZOTHIAZINES OR BENZOXAZINES

[75] Inventors: John Krapcho, Somerset; Chester Frank Turk, Kendall Park, both of N.J.

[73] Assignee: E. R. Squibb & Sons, Inc., Princeton, N.J.

[22] Filed: Dec. 6, 1974

[21] Appl. No.: 530,123

[52] U.S. Cl. .......... 260/243 R; 260/244 R; 424/246; 424/248
[51] Int. Cl.² .............. C07D 279/16; C07D 265/28
[58] Field of Search ..................... 260/243 R, 244 R

[56] References Cited
UNITED STATES PATENTS

| | | | |
|---|---|---|---|
| 3,763,153 | 10/1973 | Krapcho et al. | 260/243 |
| 3,829,421 | 8/1974 | Irmscher et al. | 260/243 |

*Primary Examiner*—John M. Ford
*Attorney, Agent, or Firm*—Lawrence S. Levinson; Merle J. Smith; Stephen B. Davis

[57] ABSTRACT

Compounds of the following formula and their pharmaceutically acceptable acid addition salts

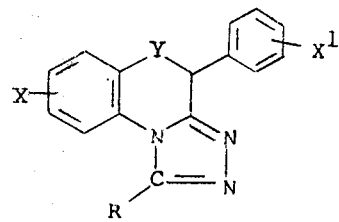

wherein R is alkyl of 1 to 4 carbons or

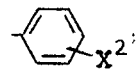

X, $X^1$ and $X^2$ are independently selected from hydrogen, halogen, trifluoromethyl, alkyl of 1 to 4 carbons, and alkoxy of 1 to 4 carbons, and Y is oxygen or sulfur; are disclosed. These compounds are useful as central nervous system depressants and in particular as anti-anxiety agents.

10 Claims, No Drawings

1-SUBSTITUTED-4-PHENYL-4H-[1,2,4]TRIAZOLO[3,4-C][1,4] BENZOTHIAZINES OR BENZOXAZINES

SUMMARY OF THE INVENTION

This invention relates to new compounds of the formula:

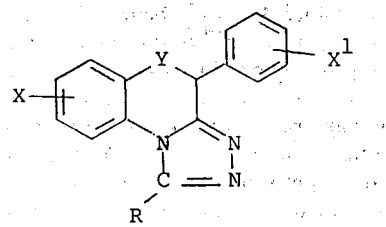

and the pharmaceutically acceptable acid-addition salts thereof which have been found to be useful as central nervous system depressants and in particular as antianxiety agents when administered to mammalian species.

R represents alkyl of 1 to 4 carbons or

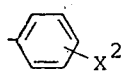

Y represents O or S.

X, $X^1$ and $X^2$ are independently selected from hydrogen, halogen (particularly Cl or F), trifluoromethyl, alkyl of 1 to 4 carbons, and alkoxy of 1 to 4 carbons.

The term "alkyl" is intended to include both straight and branched chain radicals, as for example, methyl, ethyl, propyl, isopropyl, butyl, t-butyl, etc. The term "alkoxy" includes such alkyl groups attached to an oxygen atom, i.e. methoxy, ethoxy, propoxy, isopropoxy, etc.

The term "acid addition salts" is intended to mean salts which may be formed for the purposes of isolation, purification, and storage, such as the oxalate salt, picrate salt, etc. and pharmaceutically acceptable salts meant for administration of the compound to a host, such as the hydrochloride, sulfate, acetate, maleate, citrate salts, etc.

DETAILED DESCRIPTION OF THE INVENTION

The new compounds of formula I are prepared by reacting a 2-phenyl-2H-1,4-(benzothiazin or benzoxazin)-3(4H)-thione of the formula

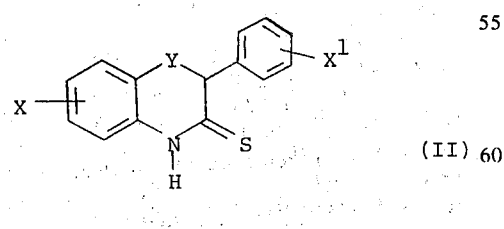

with a hydrazide of the formula

wherein R, Y, X and $X^1$ are as defined above. This reaction is performed by heating a mixture of the compounds of formula II and III in an organic solvent, preferably an alcohol of 2 to 5 carbons, at about the reflux temperature for from about 12 hours to about 48 hours, preferably about 24 hours. The rate of reaction is increased by incorporating with the alcohol a portion of dimethylsulfoxide (DMSO). The ratio of alcohol to DMSO can vary from about 1:1 to about 8:1 on a volume basis with about 4:1 being preferred.

The intermediates of formula II are prepared by reacting a compound of the formula

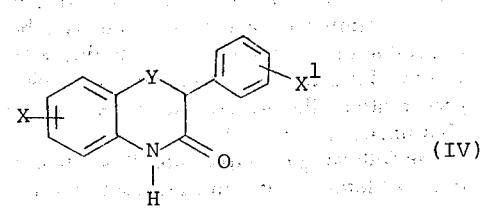

with phosphorous pentasulfide. This reaction is performed in the presence of pyridine by heating the mixture at about the reflux temperature for about one hour.

The prepartion of the starting materials of formula IV are known in the art. For example, the benzothiazines (i.e. Y is sulfur) can be prepared by reacting a 2-aminothiophenol of the formula with a halo acid of the formula wherein halo is preferably bromine and Z is hydrogen, methyl or ethyl as taught in U.S. Pat. No. 3,166,554 to Krapcho. Similarly, the benzoxazines (i.e. Y is oxygen) can be prepared by reacting a o-nitrophenol of the formula with ethyl bromo-2-phenylacetate to form ethyl 2-o-nitrophenoxy-2-phenylacetate with is then treated with Raney nickel and hydrogenated as disclosed in U.S. Pat. No. 3,557,103 to Nordlin.

Preferred are the compounds of formula I wherein:
R is alkyl of 1 to 4 carbons.
X and $X^1$ are independently selected from hydrogen, Cl, F, $CH_3$, $OCH_3$, and $CF_3$.

The compounds of formula I including the pharmaceutically acceptable acid-addition salts have been found to be useful as central nervous system depressants and in particular as anti-anxiety agents when administered to mammalian species such as rats, dogs, cats, etc., in amounts ranging from about 0.5 mg. to about 10.0 mg. per kg. of body weight per day, preferably from about 1 mg. to about 5 mg., in single or divided doses.

The anti-anxiety property of these compounds is demonstrated by ataxia and decreased grip strength observed when the compounds were administered to rats within the above stated dosage range.

For this pharmaceutical purpose a compound or mixture of compounds of formula I or their acid addition salts may be administered orally or parenterally in a conventional dosage form such as tablet, capsule, injectable or the like by compounding with other conventional ingredients such as vehicle, excipient, binder, preservative, flavor, etc., as called for by accepted pharmaceutical practice.

The following examples are illustrative of the invention. All temperatures are expressed on the Centigrade scale.

EXAMPLE 1

1-Methyl-4-phenyl-4$\underline{H}$-[1,2,4]triazolo[3,4-c][1,4]benzothiazine a. 2-Phenyl-2$\underline{H}$-1,4-benzothiazin-3(4$\underline{H}$)-thione A mixture of 30 g. (0.12 mole) of 2-phenyl-2$\underline{H}$-1,4-benzothiazin-3(4$\underline{H}$)-one, 28 g. (0.12 mole) of phosphorous pentasulfide, and 300 ml. of pyridine is refluxed for one hour. The orange-red solution is cooled and poured into 2 l. of ice-cold saturated sodium chloride solution to precipitate a yellow solid. This solid is collected after an hour, washed with water, and air-dried to yield 33 g. of product; m.p. 236°–238°. Crystallization from a mixture of 60 ml. of DMSO and 300 ml. of methanol yields 27 g. of pale yellow 2-phenyl-2$\underline{H}$-1,4-benzothiazin-3(4$\underline{H}$)-thione; m.p. 236°–238°.

b. 1-Methyl-4-phenyl-4$\underline{H}$-[1,2,4]triazolo[3,4-c][1,4]benzothiazine

A stirred mixture of 5.0 g. (0.019 mole) of 2-phenyl-2$\underline{H}$-1,4-benzothiazin-3(4$\underline{H}$)-thione from part (a), 4.4 g. (0.06 mole) of acethydrazide, 80 ml. of n-butanol and 20 ml. of DMSO is heated under $N_2$ and the resulting solution is refluxed for 23 hours. The solution is concentrated on a rotary evaporator at 1 mm. and the cooled residue is stirred with 150 ml. of ether and 50 ml. of water. A solid separates and after several hours in the cold room the material is filtered, washed with water and ether, and air-dried to yield 3.8 g. of crude product; m.p. 96°–99°. This crude product is crystallized from 25 ml. of ethyl acetate — 25 ml. of hexane to give 2.3 g. of pale yellow solid; m.p. 146°–148° (s. 139°). Recrystallization from 15 ml. ethyl acetate — 20 ml. hexane yields 1.8 g. of cream-colored 1-methyl-4-phenyl-4$\underline{H}$-[1,2,4]triazolo[3,4-c]-[1,4]benzothiazine; m.p. 149°–151°.

EXAMPLE 2

4-(2-Chlorophenyl)-1-methyl-4$\underline{H}$-[1,2,4]triazolo[3,4-c][1,4]-benzothiazine a. 2-(2-Chlorophenyl)-2$\underline{H}$-1,4-benzothiazin-3(4$\underline{H}$)-thione 55.1 g. (0.2 mole) of 2-(2-chlorophenyl)-2$\underline{H}$-1,4-benzothiazin-3(4$\underline{H}$)-one and 57.6 g. (0.2 mole) of phosphorous pentasulfide are reacted in 500 ml. of pyridine according to the procedure of Example 1(a) to yield 53.3 g. of yellow crystals; m.p. 194°–199°. A solution of this material in 50 ml. of hot DMSO is diluted with 350 ml. of acetonitrile to slowly crystallize 42.9 g. of yellow crystals of 2-(2-chlorophenyl)-2$\underline{H}$-1,4-benzothiazin-3(4$\underline{H}$)-thione; m.p. 192°–194°.

b. 4-(2-Chlorophenyl)-1-methyl-4$\underline{H}$-[1,2,4]triazolo[3,4-c]-[1,4]benzothiazine A solution of 15 g. (0.051 mole) of 2-(2-chlorophenyl)-2$\underline{H}$-1,4-benzothiazin-3(4$\underline{H}$)-thione from part (a) and 11 g. (0.15 mole) of acethydrazide in 240 ml. of butanol and 60 ml. of DMSO is stirred and heated at reflux temperature for 24 hours. After cooling, a colorless solid is removed by filtration and the solvent is evaporated to an oil using a hi-vacuum pump to remove DMSO. This oil residue is mixed with 400 ml. of ether and 150 ml. of water in a separatory funnel. The ether layer is extracted with water twice, dried ($MgSO_4$) and concentrated to an oil. This oil is treated with 150 ml. of acetonitrile, filtered, and concentrated to approximately 100 ml. After standing at room temperature for 2 hours, the yellow crystals which formed are separated by filtration. The mother liquor is then concentrated to half its volume and cooled overnight to yield 7.1 g. of cream-colored crystals; m.p. 140°–144°. This material is treated with 40 ml. of boiling acetonitrile, filtered, and concentrated to one half volume. The solution is cooled overnight to yield 4.2 g. of crude product; m.p. 145°–147°. Recrystallization from 5 ml. of ethanol gives 3.0 g. of cream-colored crystals of 4-(2-chlorophenyl)-1-methyl-4$\underline{H}$-[1,2,4]triazolo[3,4-c][1,4]benzothiazine; m.p. 148°–150°.

EXAMPLE 3

1-Methyl-4-phenyl-4$\underline{H}$-[1,2,4]triazolo[3,4-c][1,4]benzoxazine a. 2-Phenyl-2$\underline{H}$-1,4-benzoxazin-3(4$\underline{H}$)-thione A mixture of 82.4 g. (0.367 mole) of 2-phenyl-2$\underline{H}$-1,4-benzoxazin-3(4$\underline{H}$)-one (prepared according to the procedure of U.S. Pat. No. 3,557,103) and 82 g. (0.37 mole) of phosphorous pentasulfide in 825 ml. of pyridine is refluxed for one hour, cooled, and poured into 4 l. of saturated sodium chloride solution. The product separates as an oil which crystallizes over a period of several hours to yield 57.6 g. of yellow crystals; m.p. 184°–187°. Crystallization from 600 ml. of acetonitrile yields 45.2 g. of yellow crystals of 2-phenyl-2$\underline{H}$-1,4-benzoxazin-3(4$\underline{H}$)-thione; m.p. 189°–191°.

b. 1-Methyl-4-phenyl-4$\underline{H}$-[1,2,4]triazolo[3,4-c][1,4]benzoxazine

A solution of 12 g. (0.05 mole) of 2-phenyl-2$\underline{H}$-1,4-benzoxazin-3(4$\underline{H}$)-thione from part (a) and 11 g. of acethydrazide in 240 ml. of butanol and 60 ml. of DMSO is refluxed for 20 hours. After cooling to 50°, the alcohol is removed by use of a rotary evaporator and the residue is diluted with 200 ml. of ether. Extraction with an equal volume of water precipitates 6.7 g. of yellow solid product at the interphase; m.p. 169°–171°. This crude product is treated with 40 ml. of hot acetonitrile, filtered, and cooled to yield 4.6 g. of cream-colored crystals of 1-methyl-4-phenyl-4$\underline{H}$-[1,2,4]triazolo[3,4-c][1,4]benzoxazine; m.p. 170°–172°.

EXAMPLES 4–15

Following the procedure of either example 1 or example 3 but employing as the starting material the compound shown below in Col. A (the procedure of example 1 is followed where Y is sulfur and the procedure of example 3 is followed where Y is oxygen) one obtains the corresponding product shown in Col. B.

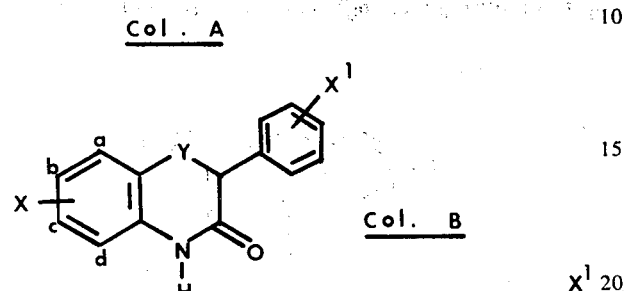

Col. A

Col. B

| Ex. | X a | b | c | d | X' ortho | meta | para |
|---|---|---|---|---|---|---|---|
| 4 | Cl | H | H | H | H | H | H |
| 5 | H | Cl | H | H | Cl | H | H |
| 6 | H | H | F | H | H | H | H |
| 7 | H | Br | H | H | H | CH₃ | H |
| 8 | H | H | H | F | H | H | OCH₃ |
| 9 | H | H | H | H | H | H | Cl |
| 10 | H | H | H | H | F | H | H |
| 11 | H | CH₃ | H | H | H | H | CF₃ |
| 12 | C₂H₅ | H | H | H | H | H | Cl |
| 13 | H | H | OCH₃ | H | H | Cl | H |
| 14 | OC₃H₇ | H | H | H | H | H | H |
| 15 | H | H | H | CF₃ | H | H | H |

EXAMPLES 16–34

Following the procedure of example 1 but substituting for the acethydrazide the compounds shown below in Col. A one obtains the final products shown in Col. B.

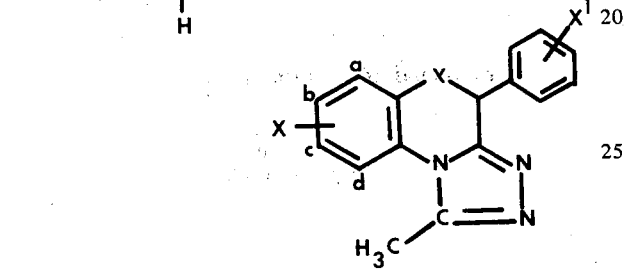

Col. A

Col. B

| Ex. | R |
|---|---|
| 16 | C₂H₅ |
| 17 | n-C₃H₇ |
| 18 | i-C₃H₇ |
| 19 | n-C₄H₉ |
| 20 | i-C₄H₉ |
| 21 | t-C₄H₉ |
| 22 | phenyl |
| 23 | 4-Cl-phenyl |
| 24 | 3-Cl-phenyl |
| 25 | 3-Cl-phenyl |
| 26 | 4-F-phenyl |
| 27 | 3-F-phenyl |
| 28 | 4-CF₃-phenyl |
| 29 | 3-CF₃-phenyl |
| 30 | 3-CH₃-phenyl |
| 31 | 4-C₂H₅-phenyl |
| 32 | 4-i-C₃H₇-phenyl |
| 33 | 4-OCH₃-phenyl |
| 34 | 2-OC₂H₅-phenyl |

Similarly, by employing the hydrazides of examples 16 to 34 in the procedure of examples 2 to 15, other compounds within the scope of the invention are obtained.

EXAMPLE 35

1-Methyl-4-phenyl-4$\underline{H}$-[1,2,4]triazolo[3,4-c][1,4]benzothiazine, hydrochloride The product from example 1 is treated with an equimolar portion of 6N alcoholic HCl to yield nearly colorless 1-methyl-4-phenyl-4$\underline{H}$-[1,2,4]triazolo[3,4-c][1,4]benzothiazine, hydrochloride; m.p. 143°–145° (foaming).

What is claimed is:

1. A compound of the formula:

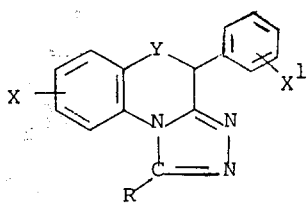

wherein R is selected from the group consisting of alkyl of 1 to 4 carbons and

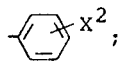

X, X¹ and X² are independently selected from the group consisting of hydrogen, halogen, trifluoromethyl, alkyl of 1 to 4 carbons and alkoxy of 1 to 4 carbons; and Y is O or S; and the pharmaceutically acceptable acid-addition salts thereof.

2. The compound of claim 1 wherein Y is sulfur.

3. The compound of claim 2 wherein R is alkyl of 1 to 4 carbons; and X and X¹ are independently selected from the group consisting of hydrogen, Cl, F, trifluoromethyl, methyl and methoxy.

4. The compound of claim 3 having the name 1-methyl-4-phenyl-4$\underline{H}$-[1,2,4]triazolo[3,4-c][1,4]benzothiazine.

5. The compound of claim 3 having the name 4-(2-chlorophenyl)-1-methyl-4$\underline{H}$-[1,2,4]triazolo[3,4-c][1,4]benzothiazine.

6. The compound of claim 1 wherein Y is oxygen.

7. The compound of claim 6 wherein R is alkyl of 1 to 4 carbons; and X and X¹ are independently selected from the group consisting of hydrogen, Cl, F, trifluoromethyl, methyl, and methoxy.

8. The compound of claim 7 having the name 1-methyl-4-phenyl-4$\underline{H}$-[1,2,4]triazolo[3,4-c][1,4]benzoxazine.

9. The process of preparing the compounds of claim 1 comprising reacting a compound of the formula

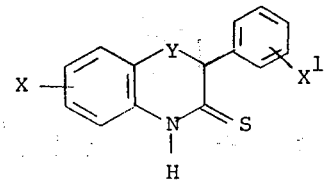

with a compound of the formula

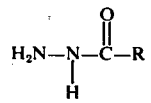

wherein X, X¹, R and Y are as defined in claim 1.

10. The process of claim 9 wherein the reaction is performed in a solvent comprising a mixture of an alcohol of 2 to 5 carbons and dimethylsulfoxide at about the reflux temperature of the solvent for from about 12 hours to about 48 hours.

* * * * *